United States Patent
Osato et al.

(10) Patent No.: US 10,360,436 B2
(45) Date of Patent: Jul. 23, 2019

(54) OBJECT DETECTION DEVICE

(71) Applicant: Hitachi Automotive Systems, Ltd., Hitachinaka-shi, Ibaraki (JP)

(72) Inventors: Takuma Osato, Tokyo (JP); Masayuki Takemura, Tokyo (JP); Yuji Otsuka, Hitachinaka (JP); Takeshi Nagasaki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 50 days.

(21) Appl. No.: 15/574,687

(22) PCT Filed: Jun. 15, 2016

(86) PCT No.: PCT/JP2016/067716
§ 371 (c)(1),
(2) Date: Nov. 16, 2017

(87) PCT Pub. No.: WO2017/002613
PCT Pub. Date: Jan. 5, 2017

(65) Prior Publication Data
US 2018/0137339 A1 May 17, 2018

(30) Foreign Application Priority Data
Jun. 30, 2015 (JP) .................................. 2015-131499

(51) Int. Cl.
*G06K 9/00* (2006.01)
*B60R 21/00* (2006.01)
(Continued)

(52) U.S. Cl.
CPC .......... *G06K 9/00201* (2013.01); *B60R 21/00* (2013.01); *G01C 3/06* (2013.01);
(Continued)

(58) Field of Classification Search
None
See application file for complete search history.

(56) References Cited

U.S. PATENT DOCUMENTS 6,005,987 A * 12/1999 Nakamura ............ G06T 3/4038
382/294
7,224,831 B2 * 5/2007 Yang .................. G06K 9/00201
382/154
(Continued)

FOREIGN PATENT DOCUMENTS

EP 2 811 423 A1 12/2014
JP 9-106500 A 4/1997
(Continued)

OTHER PUBLICATIONS

International Search Report (PCT/ISA/210) issued in PCT Application No. PCT/JP2016/067716 dated Aug. 2, 2016 with English translation (2 pages).
(Continued)

*Primary Examiner* — Fayyaz Alam
(74) *Attorney, Agent, or Firm* — Crowell & Moring LLP

(57) ABSTRACT

Provided is an object detection device capable of reliably recognizing a vehicle. This object detection device detects multiple three-dimensional objects from a left image and a right image captured with a left imaging unit and a right imaging unit (S103), extracts, as combination candidates from among the multiple three-dimensional objects, two three-dimensional objects which exist with an interval to the left/right, and determines whether a sparse parallax region, which is a region having a smaller parallax density than left/right regions, exists in an intermediate region between the two three-dimensional objects extracted as combination candidates. Then, the regions of two three-dimensional objects (for which it has been determined that a sparse parallax region exists in the intermediate region, and which have tentatively been identified as a single three-dimensional object) are extracted respectively from the left and right images and compared to each other, a determination is made regarding whether the perspective is the same, and when it is determined that the perspective is the same, the two three-dimensional objects are determined to be a single three-dimensional object.

10 Claims, 16 Drawing Sheets

(51) Int. Cl.
*G01C 3/06* (2006.01)
*G06T 1/00* (2006.01)
*G06T 7/00* (2017.01)
*G08G 1/16* (2006.01)
*G06K 9/32* (2006.01)
*G08G 1/04* (2006.01)

(52) U.S. Cl.
CPC ..... *G06K 9/00791* (2013.01); *G06K 9/00805* (2013.01); *G06K 9/3241* (2013.01); *G06T 1/00* (2013.01); *G06T 7/00* (2013.01); *G08G 1/04* (2013.01); *G08G 1/16* (2013.01)

(56) References Cited

U.S. PATENT DOCUMENTS

| | | | | |
|---|---|---|---|---|
| 2005/0089212 | A1* | 4/2005 | Mashitani | H04N 13/296 382/154 |
| 2007/0053584 | A1* | 3/2007 | Nagaoka | G06K 9/00651 382/154 |
| 2008/0089556 | A1* | 4/2008 | Salgian | G06K 9/209 382/103 |
| 2015/0278578 | A1 | 10/2015 | Otsuka et al. | |

FOREIGN PATENT DOCUMENTS

| | | |
|---|---|---|
| JP | 2010-224936 A | 10/2010 |
| JP | 2014-96005 A | 5/2014 |
| WO | WO 2014/073322 A1 | 5/2014 |

OTHER PUBLICATIONS

Japanese-language Written Opinion (PCT/ISA/237) issued in PCT Application No. PCT/JP2016/067716 dated Aug. 2, 2016 (3 pages).
Extended European Search Report issued in counterpart European Application No. 16817722.8 dated Jan. 28, 2019 (11 pages).
Lee et al., "Stereo vision-based vehicle detection using a road feature and disparity histogram," Optical Engineering, Feb. 2011, pp. 027004-1-027004-23, vol. 50, No. 2.
Toulminet et al., "Vehicle Detection by Means of Stereo Vision-Based Obstacles Features Extraction and Monocular Pattern Analysis," IEEE Transactions on Image Processing, Aug. 2006, pp. 2364-2375, vol. 15, No. 8.

* cited by examiner (1) THREE-DIMENSIONAL OBJECT
    DETECTION RESULT (2) THREE-DIMENSIONAL OBJECT      EXTRACT COMBINATION
    COMBINATION CANDIDATE          CANDIDATE

HEIGHT NG     OK     WIDTH NG

THREE-DIMENSIONAL OBJECT DETECTION RESULT

THREE-DIMENSIONAL OBJECT COMBINATION CANDIDATE (1) THREE-DIMENSIONAL OBJECT DETECTION RESULT (2) THREE-DIMENSIONAL OBJECT COMBINATION CANDIDATE (3) OVERHEAD VIEW

THREE-DIMENSIONAL OBJECT DETECTION RESULT

THREE-DIMENSIONAL OBJECT COMBINATION CANDIDATE

OBJECT DETECTION DEVICE

TECHNICAL FIELD

The present invention relates to an object detection device.

BACKGROUND ART

One of the main applications of an object detection device is, for example, to detect an obstacle in the state of being mounted on a vehicle. When the obstacle ahead is a vehicle, it is desirable to more accurately detect the vehicle and calculate a position and speed information thereof. The calculated position and speed information is used, for example, as an input of a collision avoidance function or a preceding vehicle following function, which leads to more appropriate vehicle control.

A background art in this technical field includes JP 2010-224936 A (PTL 1). This publication describes that "an object detection device, which is capable of accurately detecting an object by accurately grouping distance data detected by a distance detection device, is provided". PTL 1 describes that it is possible to accurately calculate position and speed information by accurately calculating a region where a vehicle exists on an image using back lamp information of the vehicle.

CITATION LIST

Patent Literature

PTL 1: JP 2010-224936 A

SUMMARY OF INVENTION

Technical Problem

However, when the lamp information is used to properly detect the vehicle as in PTL 1, the detection performance in a scene where a lamp of a preceding vehicle is turned on, such as night time or the middle of braking, is improved, but there is no effect in a scene where the lamp is turned off. To use characteristics of a vehicle that can be used regardless of the scene becomes important task, in order to properly detect the vehicle in more scenes.

The present invention has been made in view of the above-described points, and an object thereof is to provide an object detection device capable of stably recognizing a vehicle.

Solution to Problem

An object detection device according to the present invention to solve the above-described problem includes: a three-dimensional object detection unit that detects a plurality of three-dimensional objects from a left image and a right image imaged by a left imaging unit and a right imaging unit; a combination candidate extraction unit that extracts two three-dimensional objects existing at an interval to the left and right from among the plurality of three-dimensional objects as a combination candidate; a sparse region determination unit that determines whether or not there is a sparse parallax region in an intermediate region between the two three-dimensional objects extracted as the combination candidate, the sparse parallax region having a parallax density smaller than that of left and right regions; a matching unit that extracts regions, obtained at the time of assuming the two three-dimensional objects for which it is determined that the sparse parallax region exists in the intermediate region as one three-dimensional object, from the left and right images, respectively, and compares the regions with each other to determine whether perspectives thereof are equal; and a three-dimensional object combining unit that determines the two three-dimensional objects as one three-dimensional object when the matching unit determines that the perspectives are equal.

Advantageous Effects of Invention

According to the present invention, it is possible to provide an object detection device capable of stably recognizing a vehicle. Incidentally, other objects, configurations, and effects will be apparent from the following description of embodiments.

DESCRIPTION OF EMBODIMENTS

Hereinafter, embodiments of the present invention will be described with reference to the drawings.

First Embodiment

Figure 1:
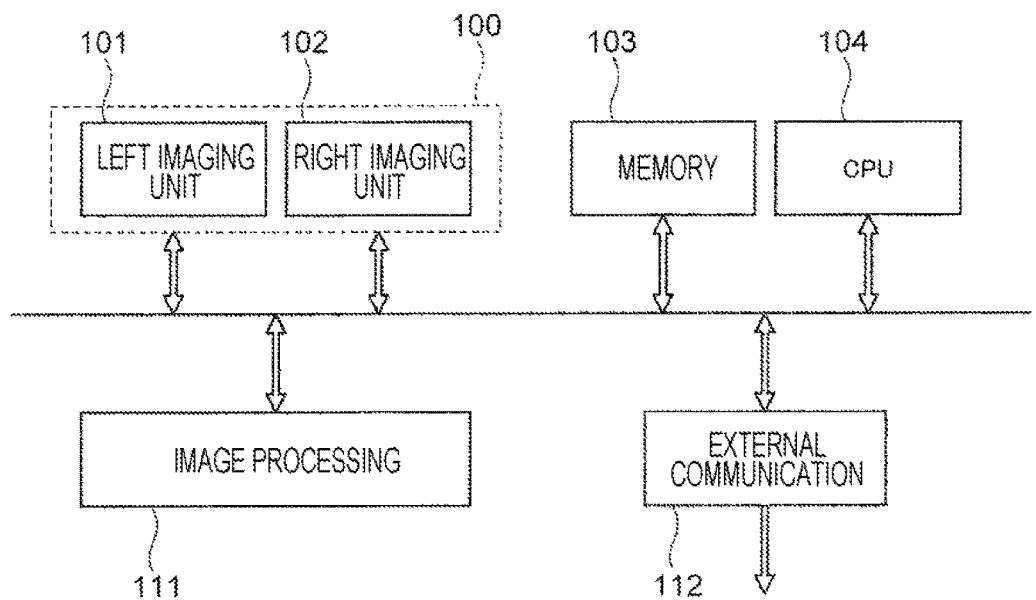
FIG. 1 is a diagram for describing an overall configuration of an object detection device according to the present embodiment.

FIG. 1 is a diagram for describing an overall configuration of an object detection device according to the present embodiment. The object detection device is mounted on a vehicle and includes a stereo camera 100, a memory 103, a CPU 104, an image processing unit 111, and an external communication unit 112 as illustrated in FIG. 1. The stereo camera 100 includes a left imaging unit 101 and a right imaging unit 102 that image the front of the vehicle as a left and right pair.

The image processing unit 111 extracts a three-dimensional object from an image imaged by the stereo camera 100, tracks the extracted three-dimensional object in a time-series order, and recognizes whether or not the object is likely to be a vehicle using a contour or a parallax shape of the tracked three-dimensional object. A recognition result is transmitted to the outside of the object detection device by the external communication unit 112 and used for vehicle control for an accelerator, a brake, a steering, or the like.

Figure 2:
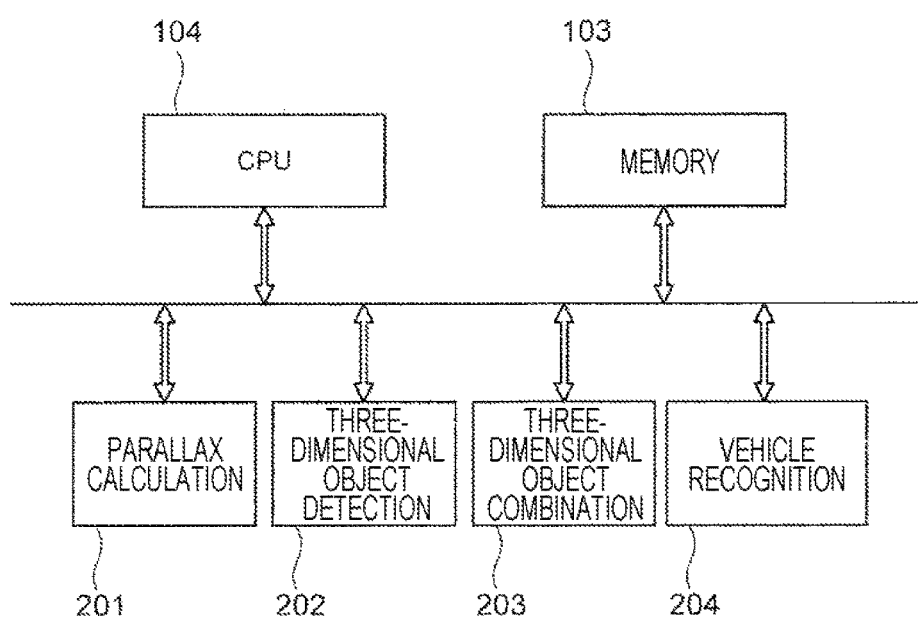
FIG. 2 is a configuration diagram of an image processing unit according to a first embodiment that performs three-dimensional object combining process.

FIG. 2 is a diagram illustrating a configuration of the image processing unit 111. The image processing unit 111 includes a parallax calculation unit 201, a three-dimensional object detection unit 202, a three-dimensional object combining unit 203, and a vehicle recognition unit 204. The parallax calculation unit 201 calculates parallax which is a deviation in imaging position of the same object using an image imaged by the left imaging unit 101 and an image imaged by the right imaging unit 102. The three-dimensional object detection unit 202 detects a three-dimensional object based on information of the parallax calculated by the parallax calculation unit 201.

The three-dimensional object detection unit 202 first calculates coordinates of points in the real space from the parallax information obtained by the parallax calculation unit 201 and an image coordinate of the parallax information in order to detect the three-dimensional object. Then, a distance between the points is calculated for the respective points, and points close to each other are grouped. When a grouping result is one three-dimensional object, a three-dimensional object considered, as one mass is detected by dividing the object at a place where the inclination suddenly changes or a region where almost no parallax is obtained. At this time, there is a tendency that the left and right of a vehicle are detected as different three-dimensional objects in the case of detecting the vehicle as the three-dimensional object.

Figure 5:
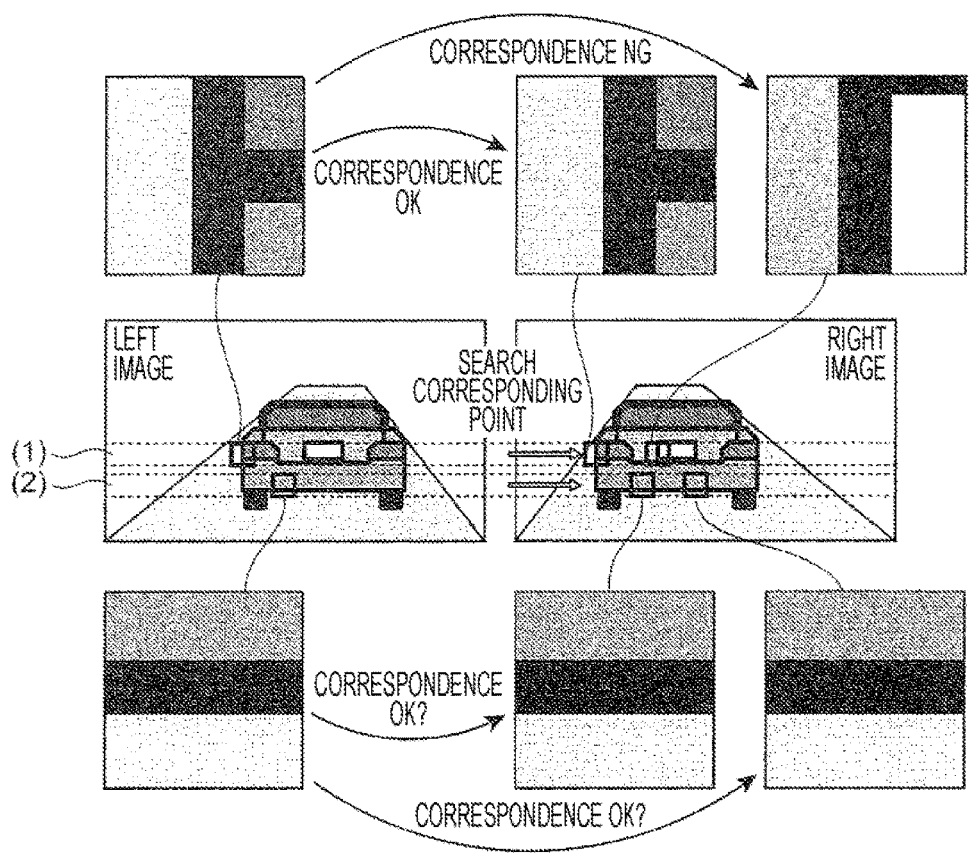
FIG. 5 is a view for describing examples of a case where calculation of parallax is easy and a case where the calculation of parallax is difficult.

FIG. 5 is a view for describing examples of a case where the calculation of parallax is easy and a case where the calculation of parallax is difficult. For example, when a certain region of a left image is designated, whether or not there is a region where the same object is imaged is present in a right image is searched toward a lateral direction in the right image, for the calculation of parallax. Therefore, in a region where there is a change in brightness in the lateral direction and there is an edge in a vertical direction as illustrated in FIG. 5(1), it is easy to set a corresponding region and to calculate parallax. On the other hand, when there is no change in brightness in the lateral direction and, for example, an edge in the lateral direction continues as illustrated in FIG. 5(2), it is difficult to set a corresponding region and to calculate parallax.

In the case of the vehicle, it is easy to calculate parallax for left and right ends since there is an edge in the longitudinal direction, but an edge in the lateral direction is continuous inmost of the central portion thereof. Therefore, the parallax becomes dense in the left and right parts of the vehicle, and the parallax becomes sparse in the central portion. As a result, the left and right ends of the vehicle are often detected as separate three-dimensional objects.

The three-dimensional object combining unit 203 performs a process of combining excessively divided three-dimensional objects. That is, when it is determined that there is a high possibility that one three-dimensional object is detected as a plurality of three-dimensional objects by the three-dimensional object detection unit 202, the three-dimensional object combining unit 203 performs the process of combining these three-dimensional objects and detecting the combined object as one three-dimensional object. Details of the process performed by the three-dimensional object combining unit 203 will be described later.

The vehicle recognition unit 204 performs vehicle recognition determination on the three-dimensional object, which has been detected as the one three-dimensional object by the three-dimensional object detection unit 202 and the three-dimensional object combining unit 203, and determines whether or not the object is the vehicle. Even in a case where one vehicle is regarded as a plurality of three-dimensional objects as the three-dimensional objects detected by the three-dimensional object detection unit 202, it is possible to appropriately recognize the object as the vehicle in the vehicle recognition unit 204 since the three-dimensional objects are combined as the one three-dimensional object in the three-dimensional object combining unit 203.

Figure 3:
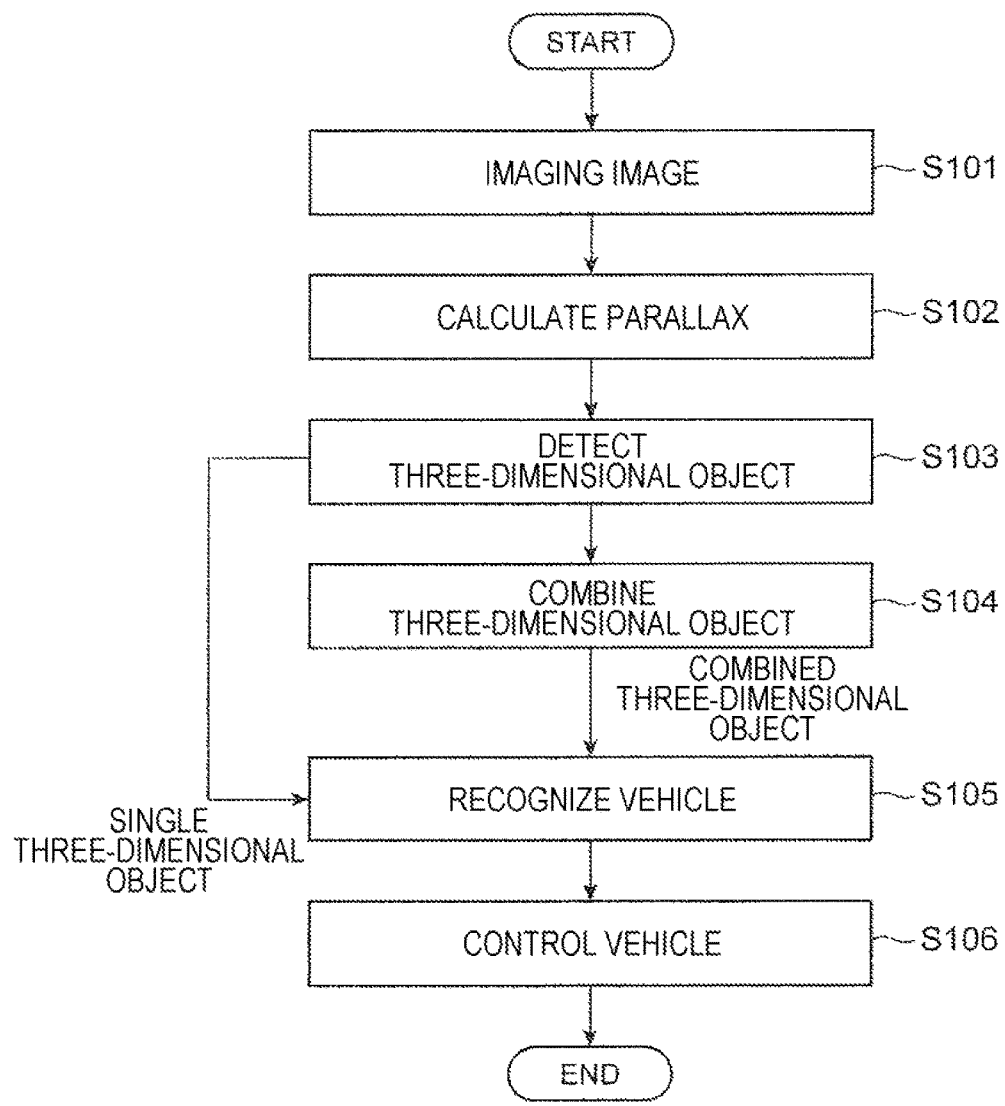
FIG. 3 is a view illustrating a processing flow of overall processing.

FIG. 3 is a view illustrating a processing flow of overall processing. As illustrated in FIG. 3, first, an image is imaged by the stereo camera 100 (S101), and the parallax is calculated by the parallax calculation unit 201 based on the imaged stereo image. Then, the three-dimensional object is detected based on information on the calculated parallax (S103). Here, it is determined whether or not one three-dimensional object is erroneously detected as a plurality of three-dimensional objects, in practice, and the plurality of three-dimensional objects are combined into the one three-dimensional object (combined three-dimensional object) when there is a high possibility of the erroneous detection as the plurality of three-dimensional objects (S104). Then, the vehicle recognition determination on whether or not a single three-dimensional object detected as one three-dimensional object in S103 or a combined three-dimensional object combined as one three-dimensional object in S104 is the vehicle is performed (S105), and the vehicle control is performed based on a result of the determination (S106).

Next, processing content in the three-dimensional object combining unit 203 will be described in detail.

Figure 4:
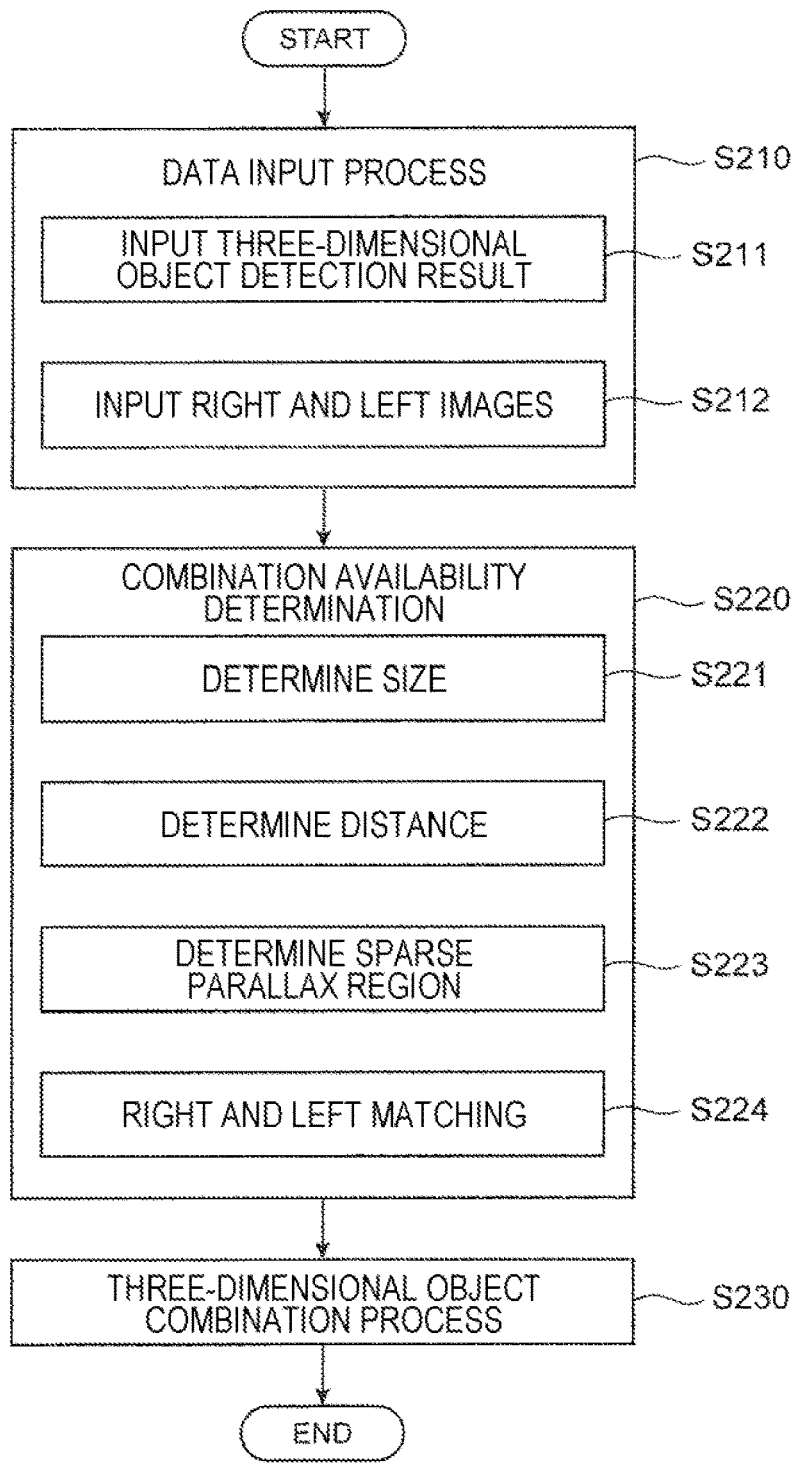
FIG. 4 is a view illustrating a processing flow of a three-dimensional object combining unit.

FIG. 4 is a view illustrating a processing flow of the three-dimensional object combining unit 203. Data necessary for processing is received in a data input process S210. A three-dimensional object detection result detected by the three-dimensional object detection unit 202 is received in a three-dimensional object detection result input process S211. The left and right images imaged by the left imaging unit 101 and the right imaging unit 102 are received in a left and right image input process S212.

Next, combination availability determination on whether or not combination processing may be performed on the received three-dimensional object is performed in a combination availability determination process S220. At this time, the determination is performed for a pair of adjacent three-dimensional objects on the image. Herein, the adjacency does not necessarily indicate a state where three-dimensional objects are in contact with each other on the image, but indicates a state where the selected two three-dimensional objects exist at an interval to the right and left without any other three-dimensional object (any other three-dimensional object being detected) in a region therebetween. In the combination availability determination process S220, a size determination process S221, a distance determination process S222, a sparse parallax region determination process S223, and a left and right matching process S224 are performed.

Next, the combination processing is performed on a pair of three-dimensional objects, which have been determined to be combinable in the combination availability determination process S220, in a three-dimensional object combination process S230. For example, a process of recalculating a distance between the three-dimensional objects by recalculating an average value of parallax included in the region or updating information on a height and a width that have been changed by the combination is performed.

Figure 6:
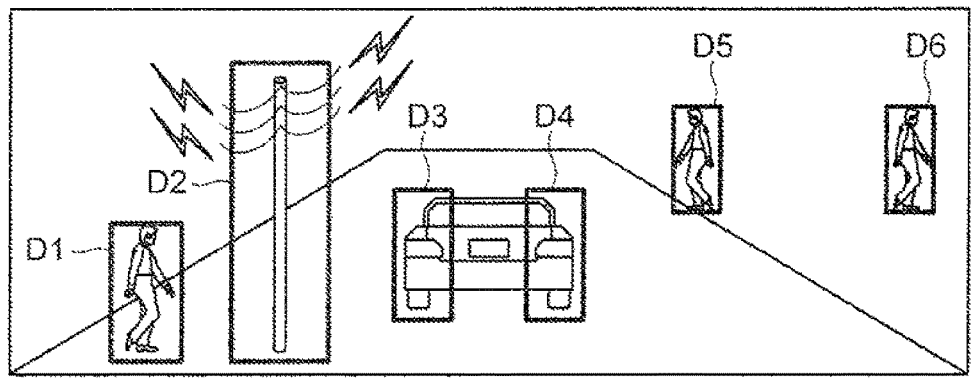
FIG. 6 is an explanatory view of processing content of a size determination process S221.
Figure 6:
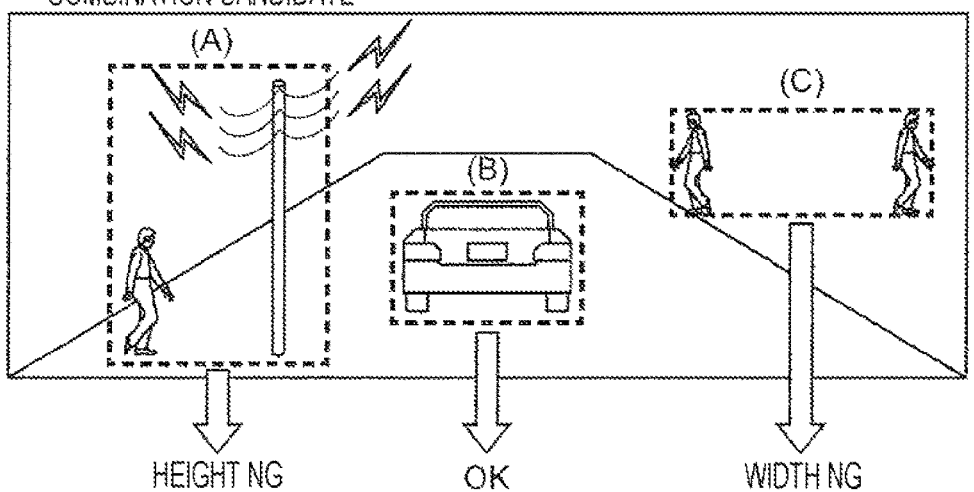
Figure 6:
Figure 6:

FIG. 6 is an explanatory view of processing content of the size determination process S221. When it is assumed that the pair of extracted three-dimensional objects is combined, it is determined whether or not an aspect ratio and the height and width indicate a size that is likely to be the vehicle, which is a detection target (size determination unit).

For example, as illustrated in (1) Three-Dimensional Object Detection Result, three-dimensional objects adjacent to each other are extracted as a three-dimensional object combination candidate for each of three-dimensional objects D1 to D6 (a combination candidate extraction unit). In the example illustrated in (2), a pair of the three-dimensional object (pedestrian) D1 and the three-dimensional object (utility pole) D2 that are adjacent to each other is defined as a three-dimensional object combination candidate (A), a pair of the three-dimensional objects (pedestrians) D5 and D6 is set as a three-dimensional object combination candidate (C) and a pair of the three-dimensional objects (left end and right ends of the vehicle) D3 and D4 is set as a three-dimensional object combination candidate (B). Such extraction of the three-dimensional object combination candidate is performed for the entire three-dimensional object in the image, and for example, a pair of the three-dimensional object (utility pole) D2 and the three-dimensional object (left end of the vehicle) D3 and a pair of the three-dimensional object (right end of the vehicle) D4 and the three-dimensional object (pedestrian) D5 are also extracted as three-dimensional object combination candidates although not illustrated.

Then, size determination is performed for each combination candidate (S221) as illustrated in (2) Three-Dimensional Object Combination Candidate. Here, it is determined whether or not a size obtained in a case where detection regions of two three-dimensional objects are set to both ends of a predetermined detection target corresponds to a size of a detection target that is decided based on an imaging distance.

For example, the three-dimensional object combination candidate (A), which is the pair of the three-dimensional object (pedestrian) D1 and the three-dimensional object (utility pole) D2, has a height of the utility pole that is obviously higher than a general vehicle. Thus, the height is determined as a height that is unlikely to be the vehicle so that a size determination result is set to NG. Then, the three-dimensional object combination candidate (C), which is the pair of the separated three-dimensional objects (pedestrians) D5 and D6, is determined to be likely to be the vehicle in terms of the height, but has a width that is extremely larger than that of the vehicle. Thus, the width is determined as a width that is unlikely to be the vehicle so that a size determination result is set to NG. Then, the three-dimensional object combination candidate (B), which is the pair of the three-dimensional objects (right end and the left end of the vehicle) D3 and D4 is determined such that both of a height and a width are likely to be the vehicle so that a size determination result is set to OK.

Figure 7:
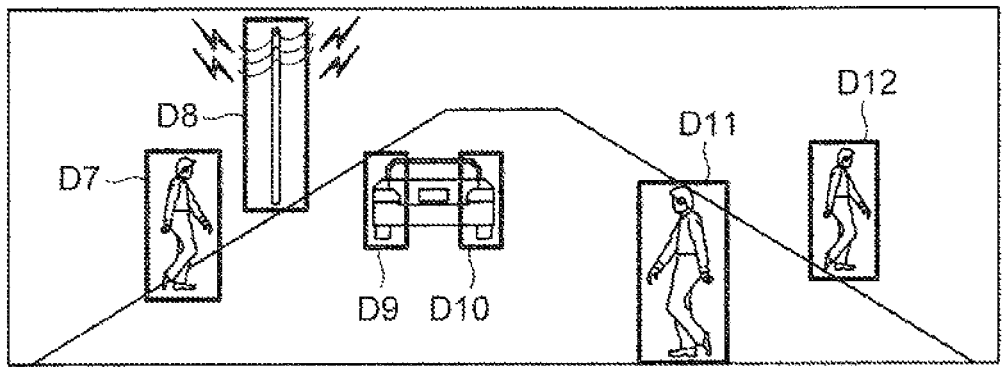
FIG. 7 is an explanatory view of processing content of a distance determination process S222.
Figure 7:
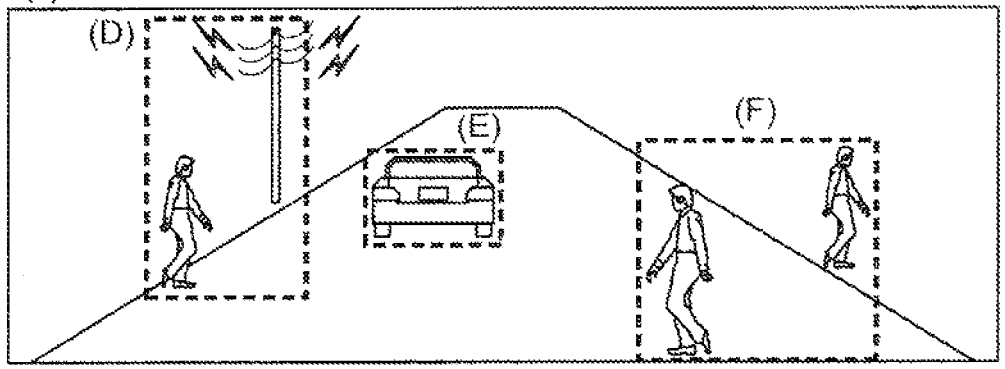
Figure 7:
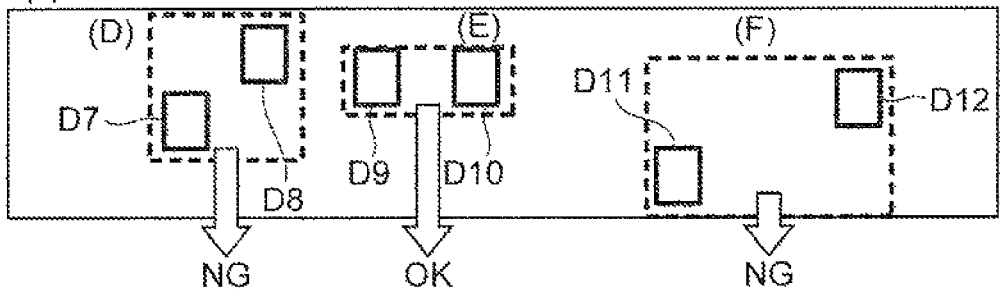
Figure 7:
Figure 7:

FIG. 7 is an explanatory view of processing content of the distance determination process S222. When it is assumed that the pair of extracted three-dimensional objects is combined, it is determined whether or not distance information between the three-dimensional objects as the pair has similar values (distance determination unit).

For example, as illustrated in (1) Three-Dimensional Object Detection Result, three-dimensional objects adjacent to each other are extracted as a three-dimensional object combination candidate for each of three-dimensional objects D7 to D12 (combination candidate extraction unit). In the example illustrated in FIG. 7, a pair of the three-dimensional object (pedestrian) D7 and the three-dimensional object (utility pole) D8 that are adjacent to each other is defined as a three-dimensional object combination candidate (D) (a pair of the three-dimensional objects (pedestrians) D11 and D12 is set as a three-dimensional object combination candidate (F), and a pair of the three-dimensional objects (left end and right ends of the vehicle) D9 and D10 is set as a three-dimensional object combination candidate (E). Although not illustrated, a pair of the three-dimensional object (utility pole) D8 and the three-dimensional object (left end of the vehicle) D9 and a pair of the three-dimensional object (right end of the vehicle) D10 and the three-dimensional object (pedestrian) D11 are also extracted as three-dimensional object combination candidates.

Then, distance determination is performed for each of the combination candidates (D) to (F) (S222) as illustrated in (2) Three-Dimensional Object Combination Candidate and (3) Overhead View. For example, although the combination candidate (D), which is the pair of the three-dimensional object (pedestrian) D7 and the three-dimensional object (utility pole) D8, is taken as the three-dimensional combination candidate since the objects are adjacent to each other on the image, the utility pole D8 is disposed at a position apart while the pedestrian D7 is disposed at the front so that the distance information on imaging distance is greatly deviated between the pair, which is set to distance determination NG. Similarly, the distance information on imaging distance is greatly deviated also for the distance candidate (F), which is the pair of the three-dimensional objects (pedestrians) D11 and D12, and thus, the distance determination NG is set. On the other hand, the distance information on imaging distance is substantially the same for the combination candidate (E), which is the pair of the three-dimensional object (the right end and the left end of the vehicle) D3 and D10, and thus, a distance determination result is set to OK.

When the determination NG is set for at least any one of the size determination process S221 and the distance determination process S222, the relevant three-dimensional object pair is excluded from the determination, and the processing is terminated as combination determination NG at such a point in time. This is for mitigation of processing unavailability of the entire three-dimensional object combining unit 203 by narrowing down a candidate in advance because the processing in the left-right matching process S224 is highly likely to be unavailable. Then, when the determination OK are obtained in both the size determination process S221 and the distance determination process S222, the relevant three-dimensional object pair is considered as a determination target of the subsequent sparse parallax region determination process S223.

In the sparse parallax region determination process S223, it is determined whether or not there is a sparse parallax region of which parallax density is lower than that of left and right region in an intermediate region between the pair of three-dimensional objects.

Figure 8:
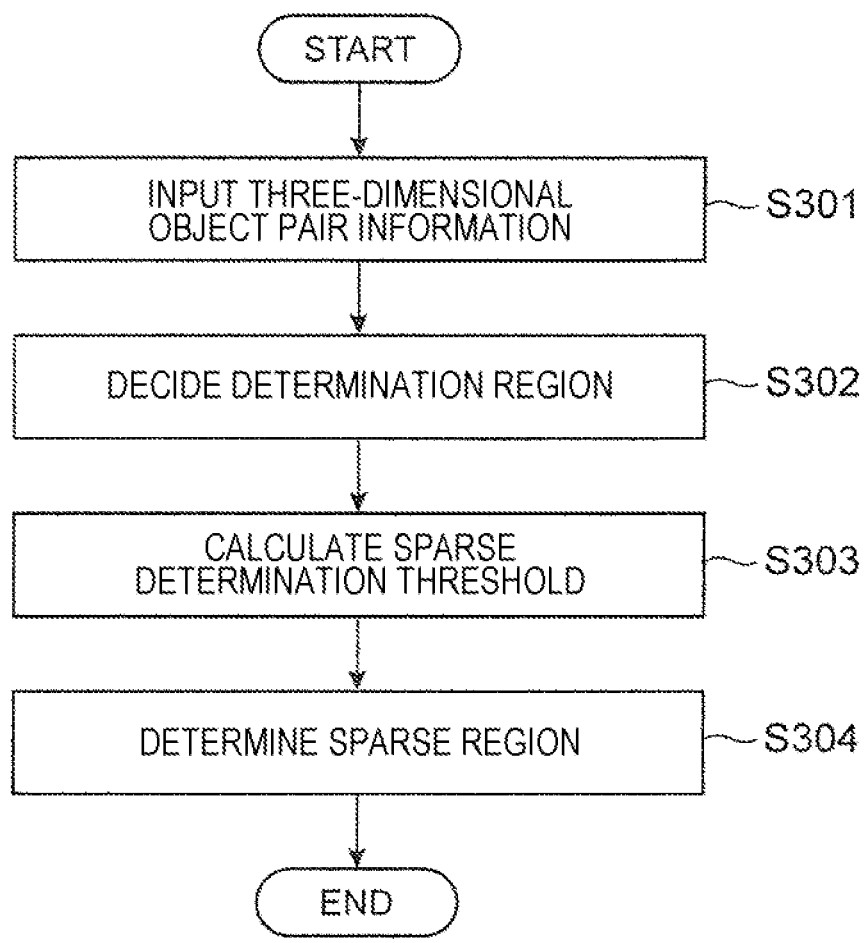
FIG. 8 is a flowchart illustrating details of processing content in a sparse parallax region determination process S223.

FIG. 8 is a flowchart illustrating details of processing content in the sparse parallax region determination process S223. Information on a three-dimensional object pair, obtained as a determination target of sparse region determination by the processing of the size determination process S221 and the distance determination process S222, is received in a three-dimensional object pair information input process S301. In a determination region decision process S302, the left and right regions where the three-dimensional object pair exists and the intermediate region therebetween are extracted, and the intermediate region is set as the target of the sparse region determination. In a sparse determination threshold calculation process S303, a parallax density threshold Th1, configured to determine whether or not the intermediate region is a sparse parallax region, is calculated and decided. In a sparse region determination process S304, it is determined whether or not the intermediate region between the three-dimensional object pair is the sparse parallax region based on the parallax density threshold Th1.

Figure 9:
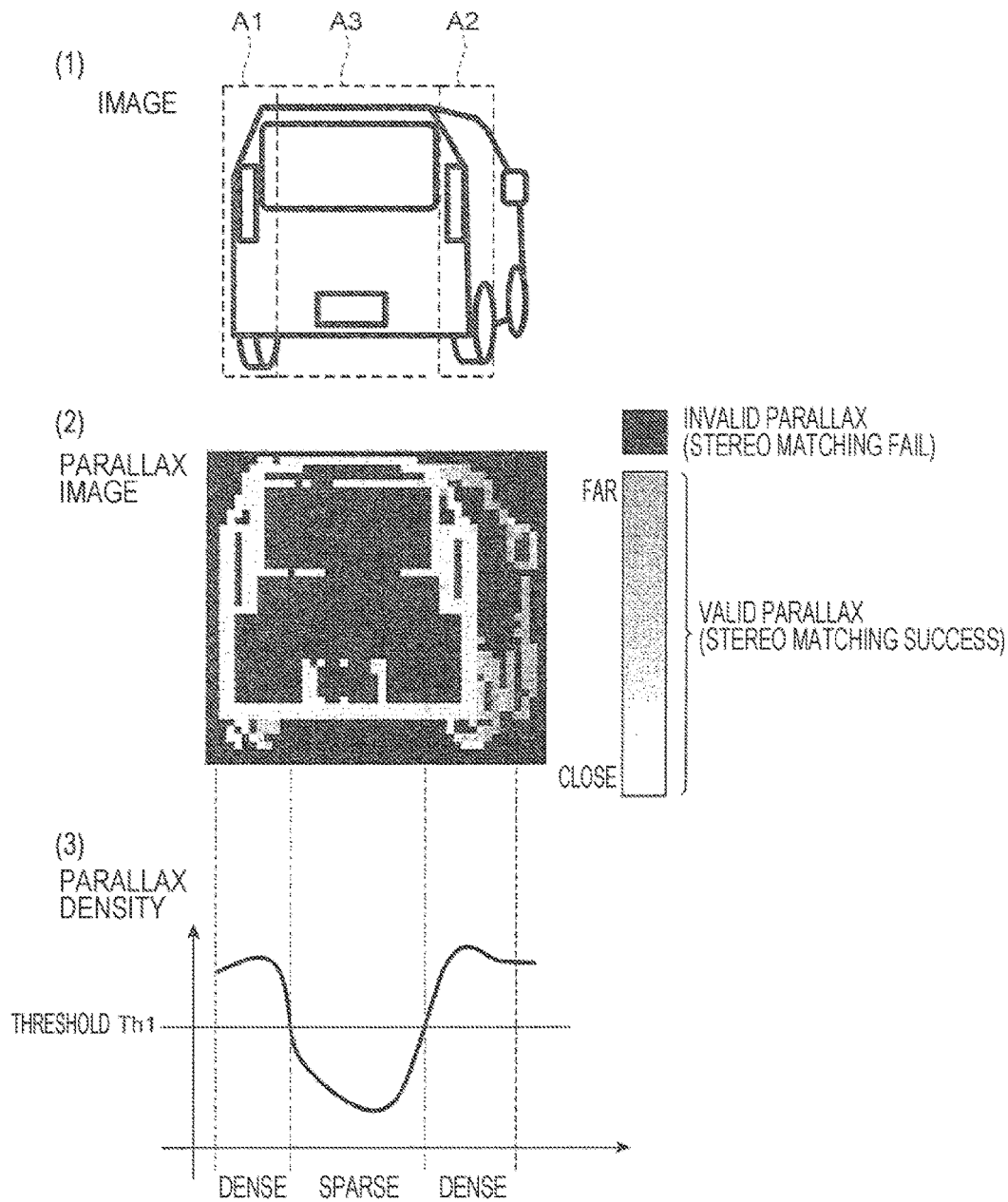
FIG. 9 is an explanatory view of processing content of a sparse region determination process S304.

FIG. 9 is an explanatory view of processing content of the sparse region determination process S304. As a specific process, for example, the density of parallax is calculated for each vertical row with respect to left and right regions A1 and A2 of the three-dimensional object pair and an intermediate region A3 therebetween. The area of valid parallax (a point at which stereo matching is succeeded) existing in a certain vertical row may be divided by the area of one vertical row to calculate the parallax density. With respect to the obtained density, determination on whether the region is the sparse parallax region or a dense region is performed based on the parallax density threshold (first threshold) Th1 (sparse region determination unit). It is determined as the sparse parallax region when the parallax density is equal to or lower than the parallax density threshold Th1, and it is determined as the parallax dense region when the parallax density is higher than the parallax density threshold Th1.

The parallax density threshold Th1 is calculated in a sparse determination threshold calculation process S303. An appropriate fixed value may be set, or a ratio with respect to the left and right parallax dense regions may be set and made variable. In the drawing, an example of the parallax density and the determination result when the parallax density threshold Th1 is fixed is illustrated. Although the technique of calculating the density for each vertical row of the image has been illustrated as an example in the present embodiment, a region may be divided into regions (left and right) detected as three-dimensional objects and an intermediate region therebetween, and each density of the regions may be calculated.

Figure 10:
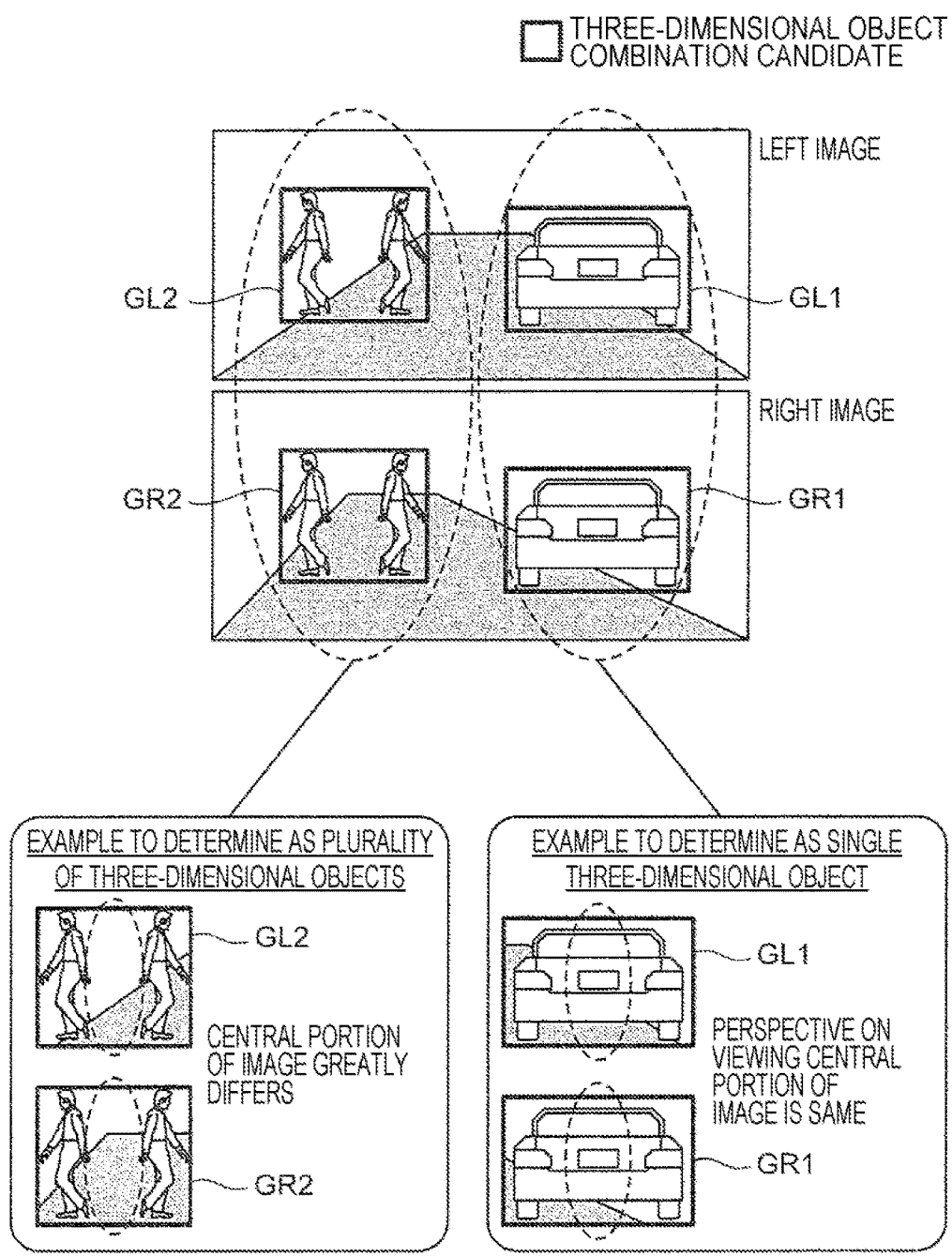
FIG. 10 is an explanatory view of processing content of a left and right matching process S224.

FIG. 10 is an explanatory view of processing content of the left-right matching process S224.

A region obtained at the time of assuming combination is extracted from each of the left and right images with respect to the three-dimensional object pair, which is the combination candidate and of which the parallax density of the intermediate region has been determined to be a sparse parallax region, and matching determination on whether or not perspectives are the same by comparing the regions with each other is performed (matching unit). A correlation value such as a SAD is used for the matching determination. The SAD is obtained by taking a difference for each coordinate in a block and adding absolute values of the differences. When the correlation value is equal to or smaller than a correlation value threshold (second threshold) Th2, it is determined that the perspective of the extracted region is the same between the left and right images. When it is determined that the perspective is the same, the three-dimensional object pair, which is the combination candidate, is determined as one three-dimensional object (combined three-dimensional object).

When the three-dimensional object pair, which is the combination candidate, includes different three-dimensional objects, the perspective differs between the left and right images because the background or the like is imaged at each central portion thereof, and the SAD takes a large value. Therefore, when the correlation value is larger than the correlation value threshold Th2, it is determined that the perspective of the extracted image is not the same between the left and right images. When it is determined that the perspective of the extracted image differs between the left and right images in this manner, the three-dimensional object pair, which is the combination candidate, is determined as the plurality of three-dimensional objects, that is, two independent three-dimensional objects.

For example, in the case of a combined three-dimensional object candidate (vehicle) GL1 of a left image and a combined three-dimensional object candidate (vehicle) GR1 of a right image, a correlation value is equal to or smaller them the correlation value threshold Th2, and it is determined that the perspective is the same between the left and right images. Therefore, the three-dimensional object pair is determined as one combined three-dimensional object, and it is determined that the three-dimensional object can be combined (combination OK).

On the other hand, in the case of a combined three-dimensional object candidate (pedestrian pair) GL2 of a left image and a combined three-dimensional object candidate (pedestrian pair) GR2 of a right image, the perspective of the central portion of the image greatly differs between the left and right images, and thus, it is determined that a correlation value is larger than the correlation value threshold Th2, and the perspective differs between the left and right images. Therefore, the three-dimensional object pair is determined as a plurality of three-dimensional objects, and it is determined that the three-dimensional objects are not allowed to be combined (combination NG).

Three-dimensional object pairs determined to be combinable by the above determination are integrated as one three-dimensional object (combined three-dimensional object) by three-dimensional object combination process S230 in FIG. 4. The integrated combined three-dimensional object is input to the vehicle recognition unit 204 of FIG. 2, and it is determined whether or not the object is the vehicle. When being determined as the vehicle, the object is properly recognized as the vehicle. A vehicle recognition result is transmitted to the outside by the external communication unit 112 in FIG. 1, and is used for applications such as the vehicle control.

According to the object detection device of the present embodiment, the three-dimensional object pair, which includes the sparse parallax region having the parallax density equal to or lower than the threshold Th1 in the intermediate region of the three-dimensional object pair, is set as the combination candidate, the matching determination is performed by extracting an image of the region obtained at the time of combining the three-dimensional object pair as the combination candidate from left and right images, and it is determined that the three-dimensional object pair is the one three-dimensional object when the perspective is the same between the left and right images, and it is determined that the three-dimensional object pair is the plurality of three-dimensional objects when the perspectives thereof differ from each other. Therefore, it is possible to appropriately detect the vehicle in more scenes regardless of whether or not a lamp of a preceding vehicle is turned on.

Although the case where an obstacle is the vehicle has been described in the present embodiment, the detection target is not limited to the vehicle, but may be another obstacle, for example, a pedestrian and the like. According to the present embodiment, the three-dimensional object pair is not combined when the determination on the size and the imaging distance of the three-dimensional object pair, and the determination on the sparse parallax region results is NO, and thus, there is a high probability that it is possible to accurately detect a three-dimensional object having a pedestrian-size which is smaller than a size of the vehicle.

Second Embodiment

Here, illustrated is an embodiment in a case where the present invention is applied from the viewpoint of appropriately dividing a three-dimensional object in the state of being excessively combined instead of appropriately combining the three-dimensional objects in the state of being excessively divided as illustrated in the first embodiment.

Figure 11:
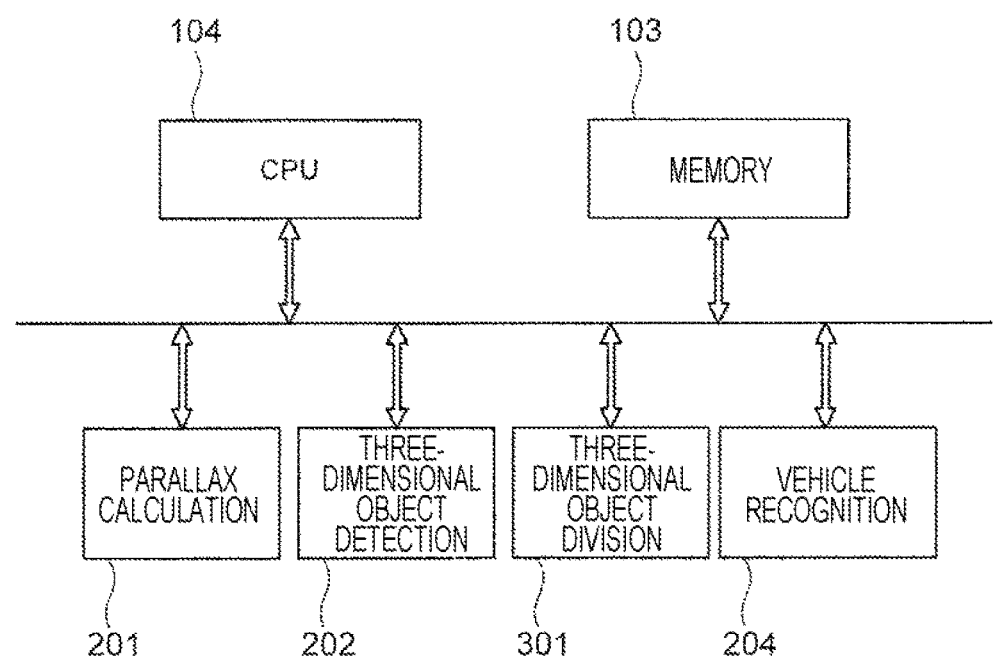
FIG. 11 is a diagram illustrating a configuration of an image processing unit according to a second embodiment.

FIG. 11 is a diagram illustrating a configuration of an image processing unit 111 according to the present embodiment. Constituent elements which are the same as those of the first embodiment will be denoted by the same reference signs, and a detailed description thereof will be omitted.

The parallax calculation unit 201 and the vehicle recognition unit 204 perform the same processing as that illustrated in the first embodiment. As compared with the first embodiment, the three-dimensional object detection unit 202 is practically adjusted so as to easily detect a plurality of three-dimensional objects as one three-dimensional object. For example, coordinates in the real space are calculated from the parallax information and the image coordinates obtained by the parallax calculation unit 201, and the points adjacent to each other are grouped, but a grouping threshold at this time is set to be large. Alternatively, when dividing the grouping result, the division in a region where parallax is not obtained is not performed.

Through such adjustment, it is possible to suppress a case of excessively dividing one three-dimensional object such as a vehicle, but it is more likely to erroneously detect a plurality of three-dimensional objects such as two pedestrians as one three-dimensional object. Therefore, a process of dividing the excessively combined three-dimensional object is performed in a three-dimensional object division unit 301.

Figure 12:
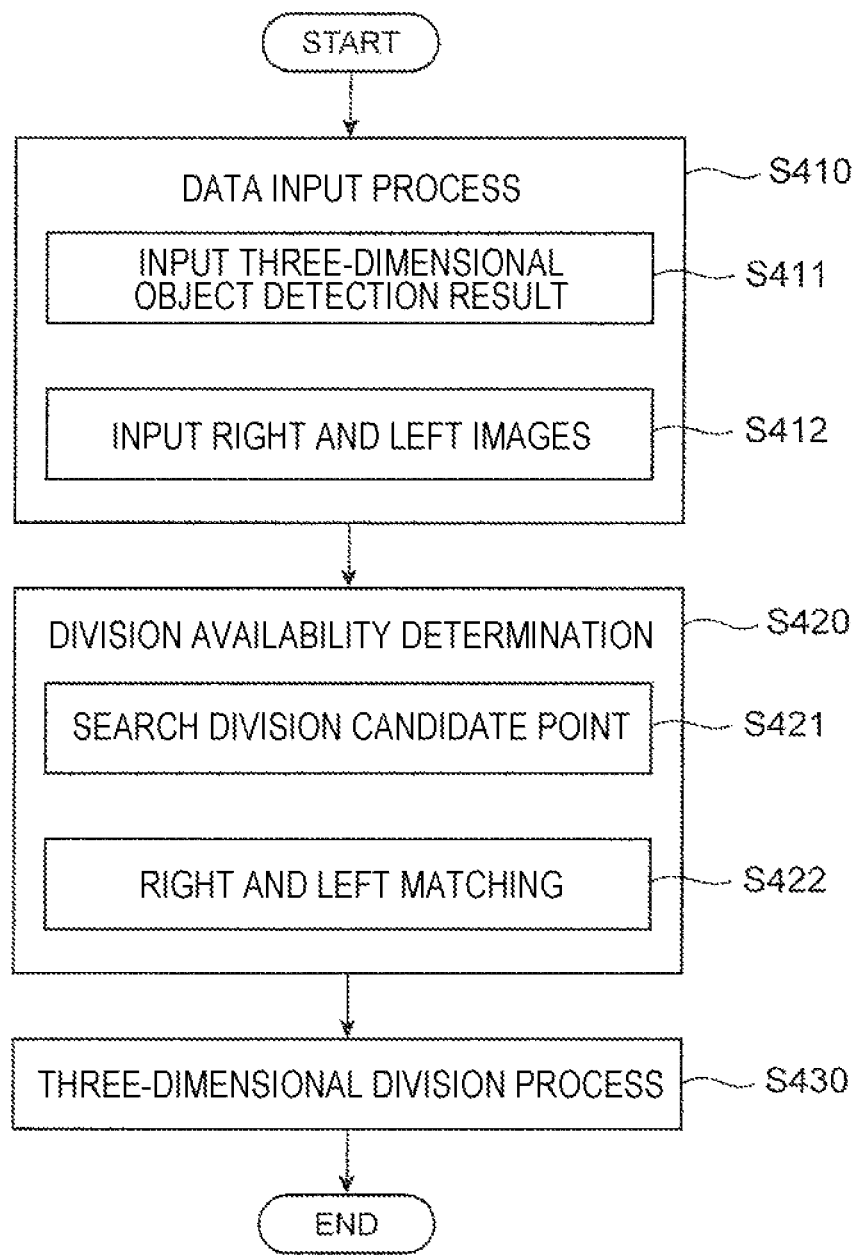
FIG. 12 is a view illustrating a processing flow of a three-dimensional object division unit 301.

FIG. 12 is a view illustrating a processing flow of the three-dimensional object division unit 301. Data necessary for processing is received in a data input process S410. A three-dimensional object detection result detected by the three-dimensional object detection unit 202 is received in a three-dimensional object detection result input process S411. The left and right images imaged by the left imaging unit 101 and the right imaging unit 102 are received in a left and right image input process S412.

Next, determination on whether or not division processing may be performed on the received three-dimensional object is performed in a division availability determination process S420. For example, a region with sparse parallax is searched (division candidate point search unit) in a division candidate point searching process S421 similarly to the sparse parallax region determination process S223. A dense parallax region and a sparse parallax region are extracted from a region of an image detected as one three-dimensional object. When the dense parallax region exists on the left and right and the sparse parallax region exists at the center, end portions of the dense parallax regions are set as division candidate points.

Next, a region in which the three-dimensional object is detected is extracted from left and right images, and it is determined whether or not perspectives tire the same between left and right images in a left-right matching process S422. A correlation value such as a SAD is used for the determination. When a correlation value is equal to or smaller than a threshold, it is determined that the left and right images are equal. When a value of the SAD is large, it is determined to be dividable since the perspective differs between the left and right images.

The three-dimensional object that has been determined to be dividable through the above-described determination is input to a three-dimensional object division process S430, and is divided into a plurality of three-dimensional objects. For example, a process of recalculating a distance between the three-dimensional objects by calculating an average value of parallax included in each of divided regions or updating information on a height and a width that have been changed by the division is performed. Thereafter, the resultant is input to the vehicle recognition unit 204 similarly to the first embodiment and processed in the same manner as the other three-dimensional objects.

According to the present embodiment, the detection of the three-dimensional object is roughly performed first, and then, it is determined whether or not the object that has been detected as one three-dimensional object is dividable. Since the determination on the division availability is performed only for the three-dimensional object detected as one three-dimensional object by the three-dimensional object detection in the present embodiment, there are fewer processing targets as compared to the first embodiment, and it is possible to shorten the processing time. The present embodiment is suitable for detection of a relatively larger detection target such as a vehicle than a relatively smaller detection target such as a pedestrian.

Third Embodiment

A third embodiment is a modification of the first embodiment. Herein, the embodiment in which a threshold used for combination determination of the three-dimensional object combining unit 203 is dynamically changed is illustrated.

Although a width, a height, an aspect ratio, and the like that are likely to be the vehicle are used for determination in the three-dimensional object combining unit 203, there are various shapes even in the vehicle sans phrase. Accordingly, it is desirable that the threshold can be dynamically changed depending on the target in order to prevent erroneous determination.

Figure 13:
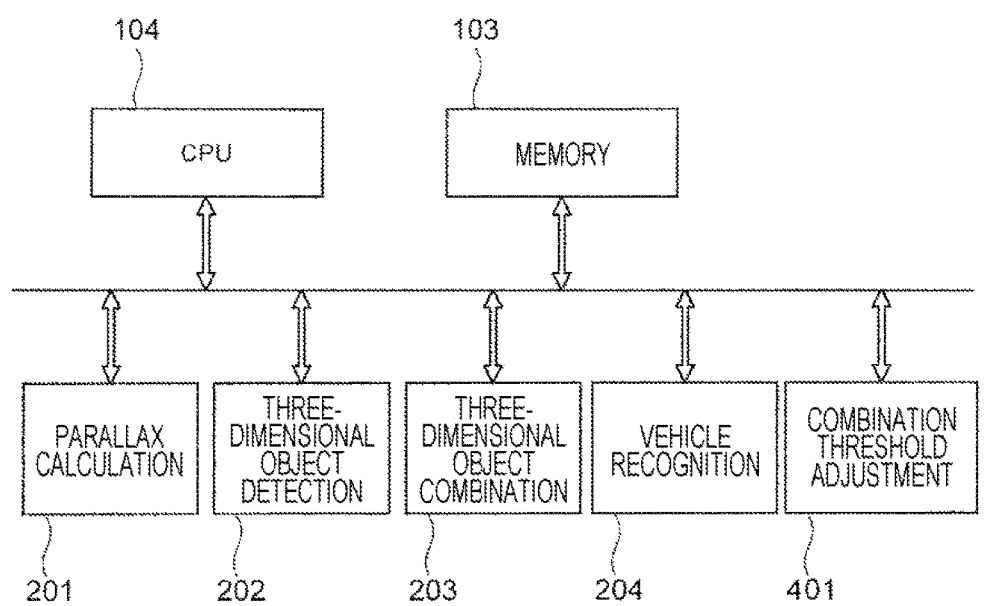
FIG. 13 is a diagram illustrating a configuration of an image processing unit according to a third embodiment.

FIG. 13 is a diagram illustrating a configuration of the image processing unit ill according to the present embodiment. Constituent elements which are the same as those of the first and second embodiments will be denoted by the same reference signs, and a detailed description thereof will be omitted.

Each processing content of from the parallax calculation unit 201 to the vehicle recognition unit 204 is the same as that in the first embodiment. The threshold to be used in the three-dimensional object combining unit 203 is calculated and dynamically changed in a combination threshold adjustment unit 401 added in the present embodiment.

Figure 14:
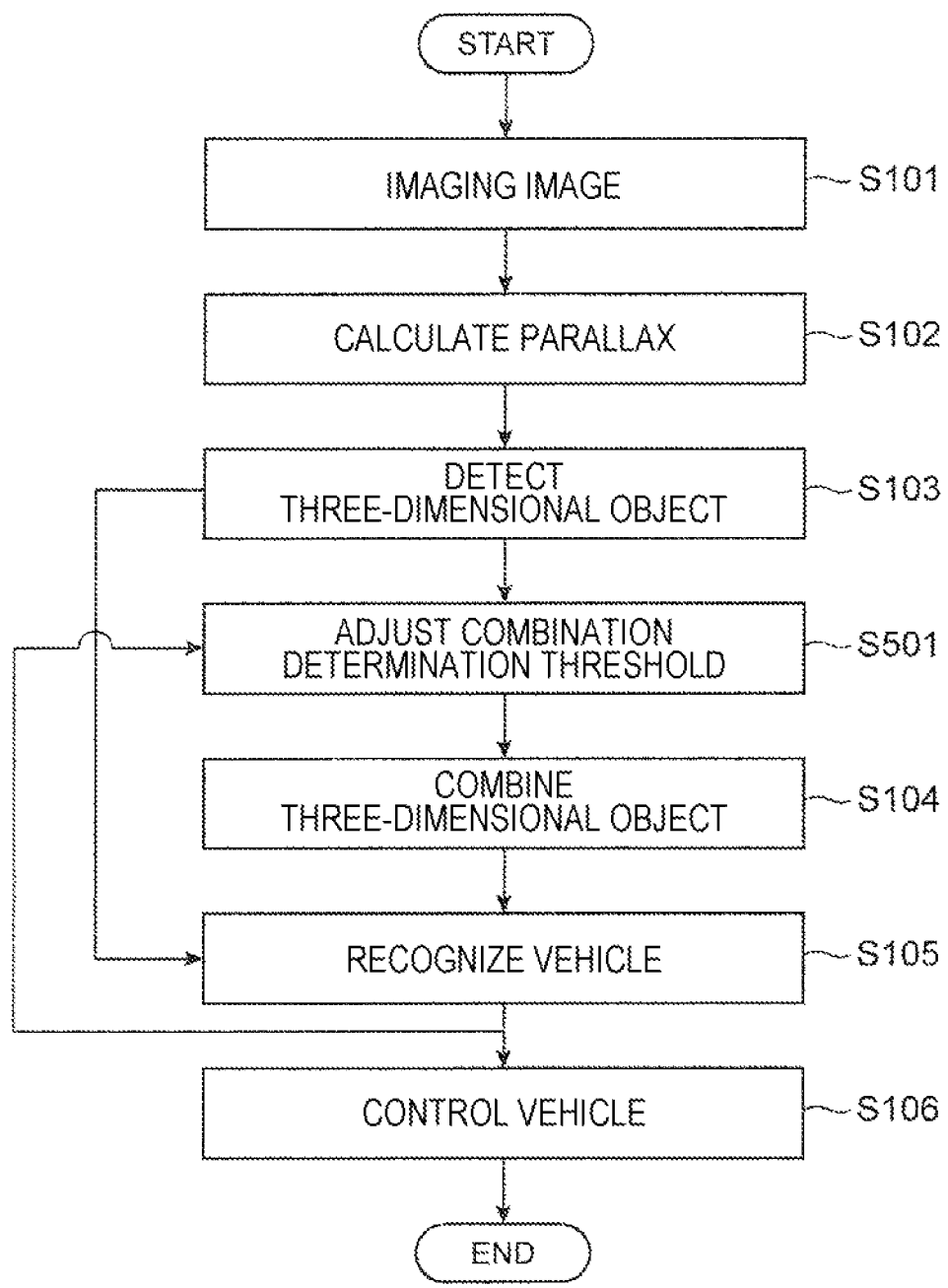
FIG. 14 is a view illustrating a processing flow of an image processing unit according to the third embodiment.

FIG. 14 is a view illustrating a processing flow according to the present embodiment. A three-dimensional object detection result in the three-dimensional object detection process S103 and a vehicle recognition result in the vehicle recognition process S105 are received, as inputs, in combination determination threshold adjustment process S501. For example, a height threshold in the size determination process S221 is taken as an example. For example, it is assumed that determination on a height is determined as OK when the height falls within "height of 1 m to 3 m" set in order to correspond to from a compact car to a large car, as an initial value of the height threshold.

Then, when a three-dimensional object with a height of 1.5 m is recognized as a vehicle as a result of vehicle recognition by the vehicle recognition process S105, it is possible to set the three-dimensional object recognized as the vehicle as a combination target and suppress erroneous combination other them the target by changing the threshold to "height of 1 m to 2 m".

Although the determination on the height has been taken as an example, it is a matter of course that it is possible to adjust various thresholds, for example, a width and an aspect ratio in the size determination process S221, a difference threshold (third threshold) of imaging distance in the distance determination process S222, a threshold of sparse region determination in the sparse parallax region determination process S223, and the like, depending on a size and vehicle type informal; ion of the vehicle. An obtained vehicle recognition result is transmitted to the outside by the external communication unit 112, and is used for applications such as the vehicle control, which is similar to the first embodiment.

Fourth Embodiment

A fourth embodiment is a modification of the first embodiment. Here, illustrated is an embodiment in which a target region is extracted in advance on an image at the time of extracting a three-dimensional object as a target in the three-dimensional object combining unit 203. It is possible to narrow down a three-dimensional object as a determination target so that an overall processing load is reduced.

Figure 15:
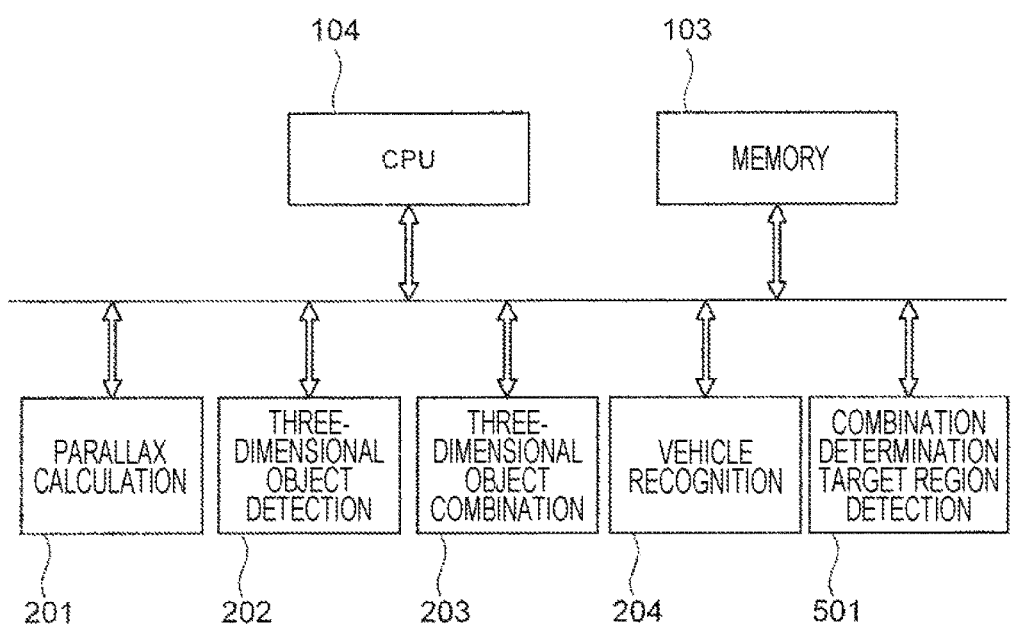
FIG. 15 is a diagram illustrating a configuration of an image processing unit according to a fourth embodiment.

FIG. 15 is a diagram illustrating a configuration of the image processing unit 111 according to the present embodiment. Constituent elements which are the same as those of the first to third embodiments will be denoted by the same reference signs, and a detailed description thereof will be omitted.

Each processing content of from the parallax calculation unit 201 to the vehicle recognition unit 204 is the same as that in the first embodiment. A region to be subjected to three-dimensional object combination determination is extracted by the three-dimensional object combining unit 203 in an added combination determination target region detection unit 501.

Figure 16:
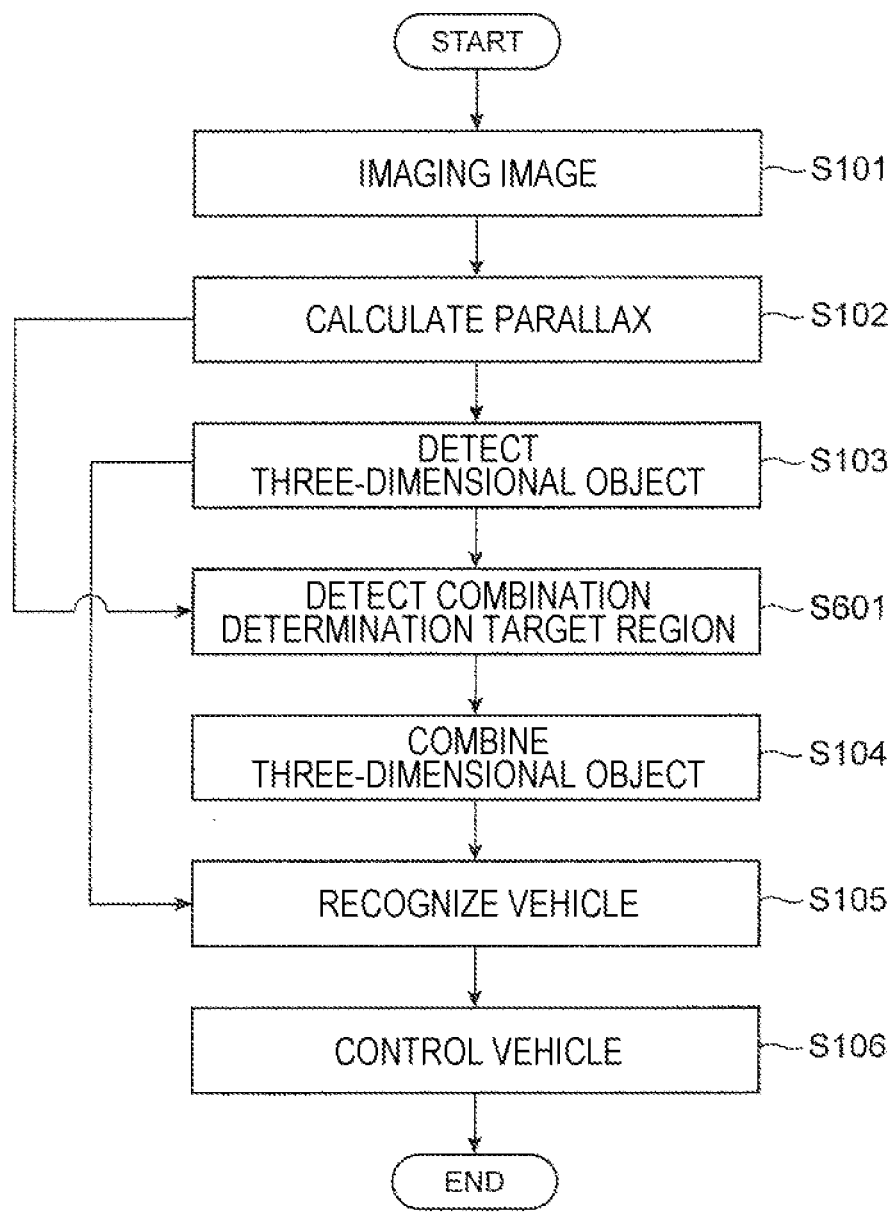
FIG. 16 is a view illustrating a processing flow according to the fourth embodiment.

FIG. 16 is a view illustrating a processing flow according to the present embodiment. A parallax image is used as an input to extract a region as a combination determination target in a combination determination target region detection process S601. For example, embodiments of performing the combination of the three-dimensional objects in the first embodiment, and performing the division of the three-dimensional object in the second embodiment have been illustrated, and both the embodiments are common in terms of performing the combination or division in the sparse parallax region. Accordingly, a parallax density map is generated for the entire parallax image in the combination determination target region detection process S601.

Here, a region where the parallax density is sparse and its surrounding region are extracted as combination determination target regions. Whether or not a region is the region with the sparse parallax density is determined based on a parallax density threshold (fourth threshold) set in advance, and it is determined as the sparse region when the parallax density on the image is equal to or lower than the parallax density threshold. Only the extracted region is processed as the combination target in the three-dimensional object combination process S104. Accordingly, there is no need to perform the determination on combination or division in a region where parallax is sufficiently obtained, and the processing load is reduced.

Meanwhile, for example, it is possible to consider region extraction using information on a traveling path of a subject vehicle estimated on the basis of CAM information and road surface information. The traveling path of the subject vehicle is estimated from the CAN information such as speed and a steering angle of the subject vehicle and surrounding environment information such as a white line, and only a three-dimensional object positioned on the subject vehicle traveling path is input into the three-dimensional object combination process S104 as a combination target. In the case of using this technique, it is possible to reduce the processing load particularly without missing the object on the traveling path relating to vehicle control. An obtained vehicle recognition result is transmitted to the outside by the external communication unit 112, and is used for applications such as the vehicle control, which is similar to the first embodiment.

Fifth Embodiment

Here, illustrated is an embodiment of a case where the present invention is applied to a system in which vehicle detection is performed using a stereo camera mounted on a vehicle and a detection result is communicated with the outside to perform vehicle control.

Figure 17:
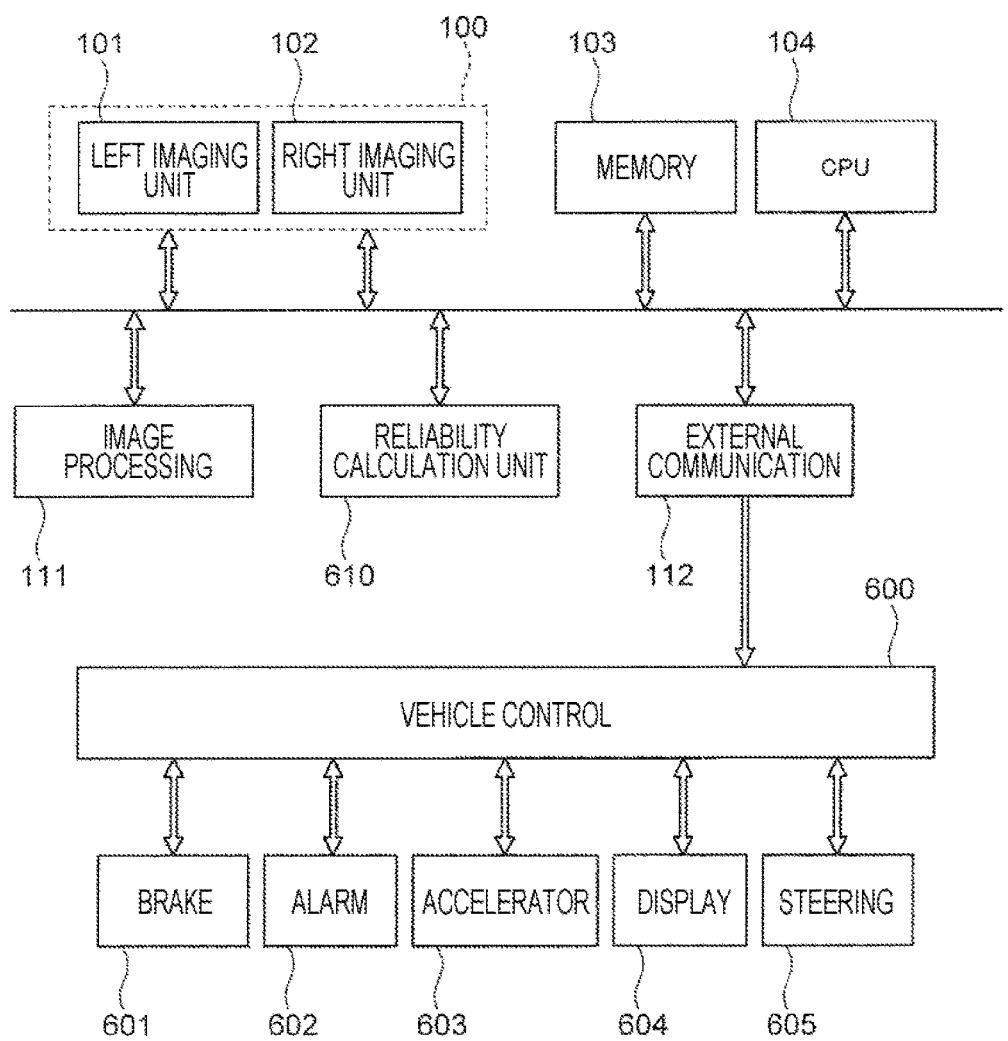
FIG. 17 is a diagram illustrating an overall configuration in the case of including vehicle control according to a fifth embodiment.

FIG. 17 is a diagram illustrating the overall configuration in the case of including the vehicle control. Constituent elements which are the same as those of the first to fourth embodiments will be denoted by the same reference signs, and a detailed description thereof will be omitted.

When performing the vehicle control, it is desirable that a control method can be changed depending on detection accuracy. For example, in order to implement a preceding vehicle following function, an appropriate position and speed are calculated to control the vehicle when a detected vehicle is definitely a vehicle, but there is a risk that an error such as a deviation in detection position is generated in the opposite case.

Thus, detection reliability information is added to a signal, to be transmitted to the outside in the external communication unit 112, in a reliability calculation unit 610. Examples of the reliability information include information to distinguish the three-dimensional object detection result in the three-dimensional object detection unit 202 from the detection result in the three-dimensional object combining unit 203. For example, a flag, configured to distinguish whether the target is a combined three-dimensional object combined in the three-dimensional object combining unit 203 or a single three-dimensional object detected by the three-dimensional object detection unit 202, is added to an external communication signal.

The signal to the outside is received by a vehicle control unit 600 to control a brake 601, an alarm 602, an accelerator 603, a steering 605, and the like. There is a possibility that a detection result of the vehicle (combined three-dimensional object) detected as the result of the three-dimensional object combining unit 203 is unstable as compared to the case of the vehicle (single three-dimensional object) detected as the result of the three-dimensional object detection unit 202.

Thus, the normal preceding vehicle following function is implemented, for example, if the vehicle corresponds to the detection result (single three-dimensional object) in the three-dimensional object detection unit 202. When the vehicle corresponds to the detection result (combined three-dimensional object) in the three-dimensional object combining unit 203, however, an operation of only weakening the control of the brake S01 or continuing the control by considering the possibility of temporarily losing sight due to the fail of combination in the three-dimensional object combining unit 203 and assuming that there is the vehicle for a very short time even after losing the sight is conceivable.

Incidentally, the present invention is not limited to the above-described embodiments, and includes various modification examples. For example, the above-described embodiments have been described in detail in order to describe the present invention in an easily understandable manner, and are not necessarily limited to one including the entire configuration that has been described above. In addition, some configurations of a certain embodiment can be substituted by configurations of another embodiment, and further, a configuration of another embodiment can be also added to a configuration of a certain embodiment. Further, addition, deletion or substitution of other configurations can be made with respect to some configurations of each embodiment.

In addition, the above-described respective configurations may be configured such that some or the whole of them may be implemented by a processor that executes a program even when being configured by hardware. In addition, only a control line and an information line considered to be necessary for the description have been illustrated, and all control lines and information lines required as a product are not illustrated. It may be considered that most of configurations are practically connected to each other.

REFERENCE SIGNS LIST

101 left imaging unit
102 right imaging unit
111 image processing unit
112 external communication unit
201 parallax calculation unit
202 three-dimensional object detection unit
203 three-dimensional object combining unit
204 vehicle recognition unit
301 three-dimensional object division unit
401 combination threshold adjustment unit
501 combination determination target region detection unit
600 vehicle control unit

The invention claimed is:

1. An object detection device comprising:
a three-dimensional object detection unit that detects a plurality of three-dimensional objects from a left image and a right image imaged by a left imaging unit and a right imaging unit;
a combination candidate extraction unit that extracts two three-dimensional objects existing at an interval to the left and right from among the plurality of three-dimensional objects as a combination candidate;
a sparse region determination unit that determines whether or not there is a sparse parallax region in an intermediate region between the two three-dimensional objects extracted as the combination candidate, the sparse parallax region having a parallax density smaller than that of left and right regions;
a matching unit that extracts regions, obtained at the time of assuming the two three-dimensional objects for which it is determined that the sparse parallax region exists in the intermediate region as one three-dimensional object, from the left and right images, respectively, and compares the regions with each other to determine whether perspectives thereof are equal; and
a three-dimensional object combining unit that determines the two three-dimensional objects as the one three-dimensional object when the matching unit determines that the perspectives are equal.

2. The object detection device according to claim 1, wherein
the sparse region determination unit determines that the sparse parallax region exists when the parallax density is equal to or lower than a first threshold.

3. The object detection device according to claim 1, wherein
the matching unit determines that the perspective is equal when a correlation value obtained by adding absolute values of differences of the regions extracted from the left and right images is equal to or smaller than a second threshold.

4. The object detection device according to claim 1, further comprising:
a size determination unit that determines whether or not a size obtained when detection regions of the two three-dimensional objects are set to both ends of a predetermined detection target corresponds to a size of the detection target determined based on an imaging distance; and
a distance determination unit that compares imaging distances of the two three-dimensional objects extracted as the combination candidates and determines whether or not the imaging distances are equal to each other, wherein
the sparse region determination unit performs determination on whether or not the sparse parallax region exists when it is determined to correspond to the size of the detection target by the size determination unit and it is determined that the respective imaging distances are equal by the distance determination unit.

5. The object detection device according to claim 4, wherein
the distance determination unit determines that the respective imaging distances are equal when a difference between the respective imaging distances of the two three-dimensional objects is equal to or smaller than a third threshold.

6. The object detection device according to claim 4, further comprising:
a vehicle recognition unit that recognizes whether or not the combined three-dimensional object determined as the one three-dimensional object by the three-dimensional object combining unit is a vehicle; and
a combination threshold adjustment unit that adjusts a determination threshold of the three-dimensional object combining unit according to a size or vehicle type information of the vehicle recognized by the vehicle recognition unit.

7. The object detection device according to claim 1, further comprising a combination determination target region detection unit that extracts a sparse region of which parallax density on an image is equal to or lower than a fourth threshold set in advance, as a combination determination target region, wherein the three-dimensional object combining unit performs the determination only for the combination determination target region as a processing target.

8. The object detection device according to claim 1, wherein the three-dimensional object combining unit sets only a three-dimensional object on a subject vehicle traveling path, estimated based on CAN information and road surface information, as a combination target.

9. The object detection device according to claim 1, further comprising a vehicle control unit, wherein information to distinguish a three-dimensional object detection result obtained by the three-dimensional object detection unit from a detection result obtained by the three-dimensional object combining unit is added to an external communication signal.

10. An object detection device comprising:

a three-dimensional object detection unit that detects a three-dimensional object from left and right images imaged by left and right imaging units;

a division candidate point search unit that determines whether or not a region having a sparse parallax density than left and right regions exists in an intermediate region of the three-dimensional object and sets end portions of a dense parallax region as division candidate points when it is determined that the region exists;

a matching unit that extracts a region from which the three-dimensional object is detected from the left and right images, and compares the regions with each other to determine whether or not perspectives are different; and a three-dimensional object division unit that divides the three-dimensional object at the division candidate points when it is determined that the perspectives are different by the matching unit.

\* \* \* \* \*